US005751345A

United States Patent [19]
Dozier et al.

[11] Patent Number: 5,751,345
[45] Date of Patent: May 12, 1998

[54] IMAGE RETENTION AND INFORMATION SECURITY SYSTEM

[75] Inventors: Charles Wayne Dozier, Garland; Thomas William Mitchell, Plano, both of Tex.

[73] Assignee: Dozier Financial Corporation, Dallas, Tex.

[21] Appl. No.: 781,032

[22] Filed: Jan. 8, 1997

Related U.S. Application Data

[62] Division of Ser. No. 386,888, Feb. 10, 1995, abandoned.

[51] Int. Cl.$^6$ .................................................. H04N 7/18
[52] U.S. Cl. .................................. 348/153; 348/159
[58] Field of Search ................................ 348/143, 150, 348/152, 153, 179; H04N 7/18

[56] References Cited

U.S. PATENT DOCUMENTS

| | | | |
|---|---|---|---|
| 3,686,434 | 8/1972 | Lemelson | 360/18 |
| 4,120,004 | 10/1978 | Coutta | 348/150 |
| 4,145,715 | 3/1979 | Clever | 348/150 |
| 4,198,656 | 4/1980 | Mathisen | 348/159 |
| 4,737,847 | 4/1988 | Araki et al. | 348/161 |
| 4,777,526 | 10/1988 | Saitoh et al. | 348/159 |
| 4,991,008 | 2/1991 | Nama | 348/150 |
| 5,151,945 | 9/1992 | Lee et al. | 348/155 |
| 5,216,502 | 6/1993 | Katz | 348/150 |
| 5,237,408 | 8/1993 | Blum et al. | 348/154 |
| 5,247,356 | 9/1993 | Ciampa | 348/144 |
| 5,253,070 | 10/1993 | Hong | 348/155 |
| 5,289,275 | 2/1994 | Ishii et al. | 348/154 |
| 5,455,561 | 10/1995 | Brown | 340/541 |
| 5,471,239 | 11/1995 | Hill et al. | 348/155 |
| 5,491,511 | 2/1996 | Odle | 348/153 |

OTHER PUBLICATIONS

HyperScan Digital Picture Transmission System (TX40, RX40), date 1994 or earlier.
SuperScan System Model VP-100 by TeleSite U.S.A., Inc. Product Brochure, date 1994 or earlier.
New Product—CRU by TeleSite U.S.A., Inc. Product Brochure, date 1994 or earlier.
FasTrans 2000 Product Brochure by Gyyr, a division of Odetics, date 1994 or earlier.
RGB/View 600 Product Brochure Video Windowing System by RGB Spectrum, copyright 1993, date 1994 or earlier.
SuperView 50 Product Brochure by RGB Spectrum, copyright 1994, date 1994 of earlier.

(List continued on next page.)

Primary Examiner—Bryan Tung
Attorney, Agent, or Firm—Sidley & Austin

[57] ABSTRACT

A video image retention and data information security system operates in conjunction with a group of transaction devices, such as receipt printers at bank teller stations. A video camera is provided at each teller station and a group of lobby video cameras are provided for security surveillance. The video cameras are connected to the video inputs of a selector which connects any one of the inputs to a video output. The video output is provided to a video board that digitizes a received image upon command. A controller, such as a personal computer, receives through a video and data channel selector, a set of information from the transaction machine, such as the data related to a bank checking transaction. The controller causes the video camera associated with the teller station to be connected to the video board which is then activated to capture an image of the customer who conducted the transaction that resulted in the generation of the receipt printer transaction. The data associated with the transaction together with the image are stored on a disk drive. A data file is stored which includes multiple data entries relating to the image file, and the image file can be retrieved by any data in the data file. Surveillance cameras operate to take sequential images wherein a comparison of pixel values is made to determine whether a substantial change has been made from one image to the net If a substantial number of the pixels differ from one image to the next, the latter image is stored for security review. Both the images generated by the teller cameras and the security images can be remotely accessed via telephone lines.

9 Claims, 5 Drawing Sheets

OTHER PUBLICATIONS

RGB/Videolink 1500 Product Brochure by RGB Spectrum, copyright 1992, date 1994 or earlier.

RGB/Videolink 1600U Product Brochure by RGB Spectrum, copyright 1992, date 1994 or earlier.

Uniplex Sprite, Uniplex Duet, Uniplex Series Video Equipment Brochures by Dedicated Micros, date 1994 of earlier.

Watchdog 250 Product Brochrure by RGB Spectrum, copyright 1993, date 1994 or earlier.

Uniplex Series 2 Product Description by Dedicated Micros, date 1994 or earlier.

DFT-0100 Product Brochure by Dedicated Micros, date 1994 or earlier.

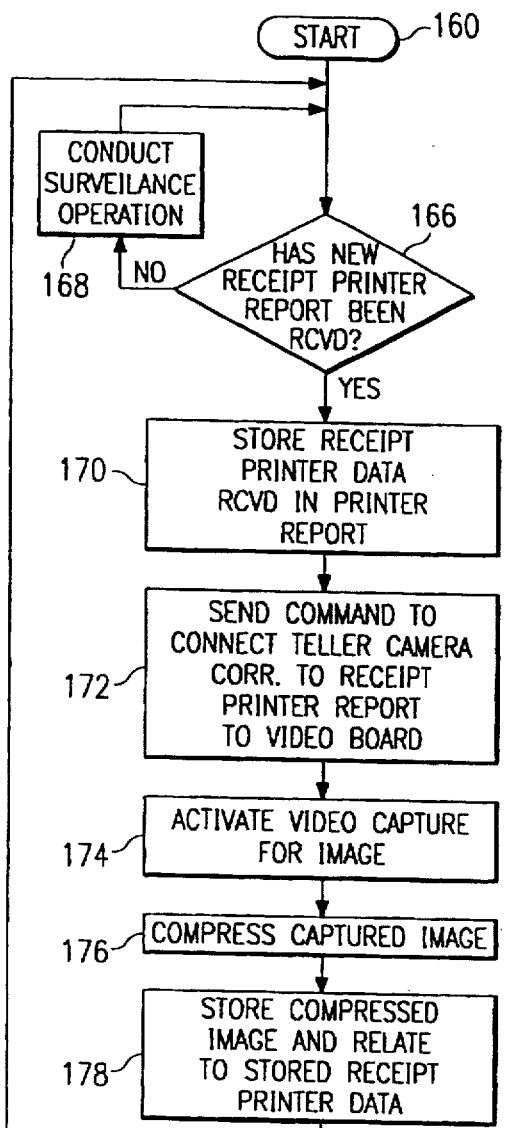
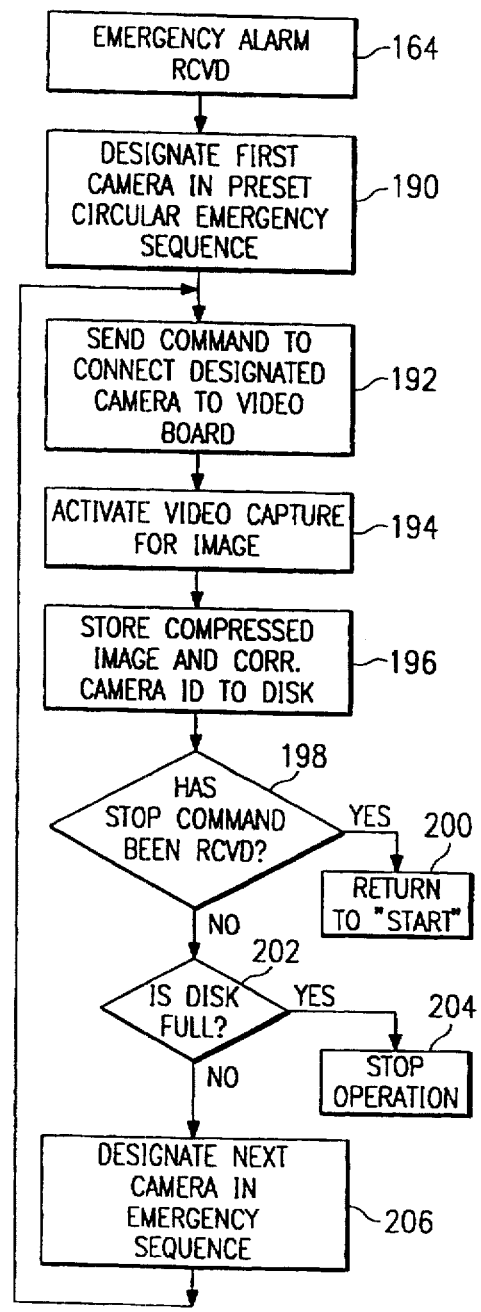
FIG. 4
FIG. 5

5,751,345

IMAGE RETENTION AND INFORMATION SECURITY SYSTEM

CROSS REFERENCE TO RELATED APPLICATIONS

This is a division of U.S. patent application Ser. No. 08/386,888 filed Feb. 10, 1995, now abandoned.

TECHNICAL FIELD OF THE INVENTION

The present invention pertains in general to video security systems and in particular to such systems which store and retrieve images by use of computer equipment and digital storage.

BACKGROUND OF THE INVENTION

A typical bank security system has video cameras at various locations in the lobby and surrounding premises. These cameras are sequentially connected to an analog video recorder which records in sequence the images produced by each of the cameras. This type of video security system has a number of problems. Since video cassette recorders can typically only record for 2–6 hours, some person must be responsible for periodically replacing recorded tapes with blank tapes and ensuring that the recorded tapes are properly labeled and stored. If it is desired to keep the security tapes for a period of months, this can involve the storage and recordkeeping for hundreds of video tapes. In order to have greater recording time, video security systems are often operated with a low tape speed which can result in poor picture quality.

When it is necessary to review a scene which occurred at some time in the past, it is often difficult to locate the required tape. A video tape has multiple scenes, all of which are recorded in sequence. It is often difficult to find the desired image which may be at any location along the tape. A substantial amount of time can be consumed in locating the appropriate tape and then locating the appropriate section of one tape to be viewed. If the operator did not properly change the tapes when required or did not properly label and store the tapes, then the image for the desired time may not exist or cannot be located.

Typical analog video security systems do not relate any particular transaction conducted by customers to images on the tape. Therefore, if one wishes to identify whether a particular individual conducted a particular transaction, which will be identified through the bank's computer system by transaction number and possibly by a teller number, it can be extremely difficult to locate the corresponding video images on tape that identify the person who made the transaction. The absence of indexing between transactions, time and other identifying data makes the retrieval of particular images very difficult.

Video tapes are easily subject to breakage and tape deterioration, particularly if the tapes are stored in an area that is not regulated for temperature and humidity.

Analog video cassette security tapes are further not readily amenable to remote access from locations outside the particular branch bank location. In general, the tape must be played on a video player and must be physically transported to the location where it is to be viewed. This makes it time consuming and difficult for a particular manager or security officer to oversee a large number of branch bank locations.

In view of these problems for bank security systems, and other installations which have similar requirements, there exists a need for a video imaging system which captures high-quality images when required, stores images in such a manner that they can be rapidly retrieved, permits remote retrieval of images and provides user-selectable image resolution.

SUMMARY OF THE INVASION

A selected embodiment of the present invention is a video image acquisition and information system for use in conjunction with a transaction device, for example a bank receipt printer, which produces selected data upon occurrence of a particular transaction, such as a bank deposit or withdrawal. The system includes a plurality of video cameras which correspond respectively to the transaction machines. A controller is connected to the data outputs of the transaction machines to capture a data file produced by the machine as a result of a transaction. A video switch is provided which has a plurality of inputs connected respectively to the video cameras and having a single video output. The video switch is operated by the controller. An image digitizer is connected to the controller and to the output of the video switch. A digital data file is generated which includes the selected data produced by the transaction machine. A digital storage, such as a disk drive, is connected to the controller for storing in the digital storage a plurality of images that have been produced by the image digitizer. Further stored in the digital storage are a plurality of the digital data files, each of which has a link to a respective one of the stored images.

A further aspect of the present invention is a method of operation for a surveillance video security system. This includes the step of digitizing a video output from a video camera at a first time to produce a first digitized image. This image comprises an array of pixels. The first digitized image is temporarily stored. The video output from the video camera is digitized at a second, later time to produce a second digitized image, which also comprises an array of pixels. The values of pixels at corresponding locations in the first and second digitized images are compared to identify the pixel locations which have different values. A count is then made to the number of pixel locations which have value differences that exceed a predetermined amount and to thereby produce a pixel difference count. The pixel difference count is compared to a predetermined threshold count for determining if the difference count exceeds the threshold count. If the difference count exceeds threshold count, the second digitized image is stored and a further digitized image is produced to repeat the sequence.

BRIEF DESCRIPTION OF THE DRAWINGS

For a more complete understanding of the present invention and the advantages thereof, reference is now made to the following description taken in conjunction with the accompanying drawings in which:

FIG. 4 is a flow diagram illustrating the system operation for recording an image and data when a transaction occurs at a teller station;

FIG. 5 is a flow diagram illustrating the operation of the video image capture during an emergency alarm condition;

DETAILED DESCRIPTION

Figure 1:
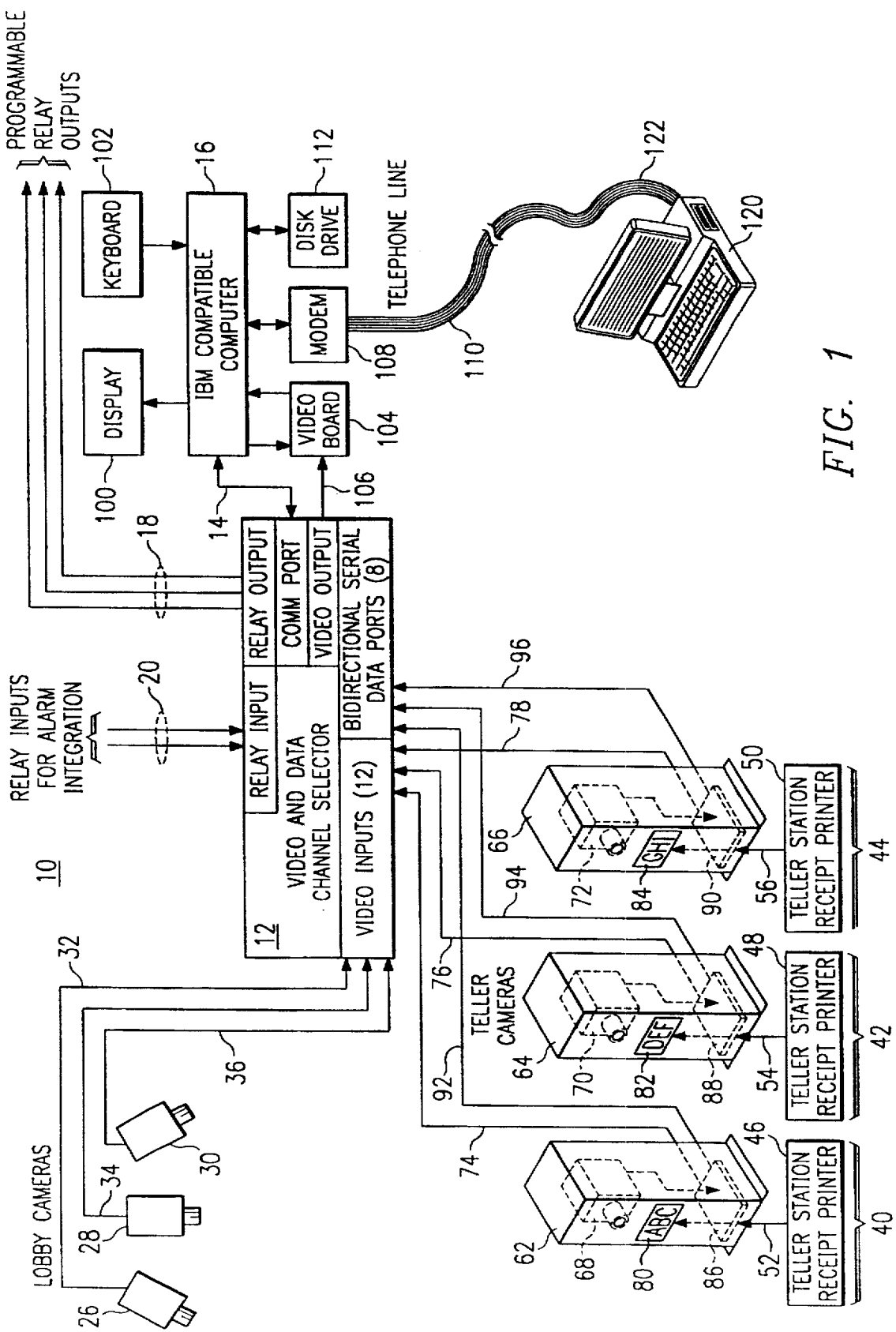
FIG. 1 is a block diagram of a video security system in accordance with the present invention.

Referring to FIG. 1, there is shown a block diagram for an image retention and information security system 10 in accordance with the present invention. A selected application of the system 10 is for use in a bank, and the invention will be described herein with respect to that environment. However, the present invention is equally applicable for other fields, for example law enforcement, customs, and airline ticket and baggage tracking. The system 10 includes a video and data channel selector 12, which is further described in reference to FIG. 2. The selector 12 has twelve video inputs, any one of which can be connected to the video output. The selector 12 further has a set of eight bidirectional serial ports for transmitting and receiving serial data. A bidirectional communication port is connected via a line 14 to an IBM compatible personal computer 16. This is typically referred to as a PC, which is widely used in many businesses. The selector 12 further includes lines 18 that are connected to relay outputs which can be programmed to produce selective relay closures for each line. The selector 12 further includes relay inputs through lines 20 for receiving selected signals, such as an alarm signal.

The security system 10 includes a set of lobby cameras 26, 28 and 30 which are connected through respective video lines 32, 34 and 36 to the video inputs of the video and data channel selector 12. The system 10 is designed to work at a bank location which has multiple teller stations. For illustrating the present invention, there are shown bank teller stations 40, 42 and 44. The teller stations include respective teller station receipt printers 46, 48 and 50. Such printers are widely used in the banking industry to print receipts for banking transactions. These receipt printers are typically tied into a bank's central computer system to record transactions. For each transaction, an electronic receipt record is produced which includes an account number, bank branch identification number, teller station identification, date and time, and a teller sequence number, which is also referred to as a transaction number. This information is transmitted from the receipt printers 46, 48 and 50 through respective lines 52, 54 and 56, as well as to the bank's central computer.

Each of the teller stations 40, 42 and 44 is provided with a corresponding camera tower 62, 64 and 66. The camera towers 62, 64 and 66 include respective television cameras 68, 70 and 72. These are preferably small, black and white, fixed focus CCD cameras.

Figure 7:
FIG. 7 is an illustration of an image captured at a teller station together with the related data, as shown on a display screen or printed.

Each of the camera towers is positioned at the teller station so that the television camera lens is directed toward a customer who is standing in the typical position at the counter for conducting a transaction with a teller. Each tower is provided with a hole in front of the camera lens so that the camera lens has a field of view of the customer at the teller station. The camera towers preferably rest on a counter top beside the teller and the camera itself is positioned at a height above the floor of between five and six feet. This provides a full view of an adult customer, such as shown in FIG. 7. The camera towers are preferably painted a dark color, such as flat black, to make them less noticeable. A particular design for such a camera tower is shown in copending design application Ser. No. 29/033,190 filed on Dec. 21, 1994.

The video camera towers 62, 64 and 66 are provided with respective alphanumeric point-of-sale displays 80, 82 and 84. Alphanumeric characters can be produced at each of these displays for providing information or advertising to bank customers. Different sample lettering is shown as examples on each of the displays. Each of the displays 80, 82 and 84 is positioned such that it faces the customer who would normally be standing at the counter of the teller station. The displays 80, 82 and 84 are optional. These could have many more characters, and even graphics, than shown in FIG. 1. These displays can be used for general advertising of bank services or customized displays for particular customers. For example, if an account number for a particular customer has been entered through the teller station receipt printer 40, a response could be sent back to the display 80 that is unique for that particular customer. For example, the following statement could be scrolled across the display: "MR. JONES, YOUR CD IS EXPIRING THIS MONTH, WOULD YOU LIKE TO RENEW IT?"

The camera towers 62, 64 and 66 are provided with respective interface circuits 86, 88 and 90 which are connected to receive the printer records from the respective receipt printers 46, 48 and 50. The circuits 86, 88 and 90 are connected through lines to the corresponding respective displays 80, 82 and 84 for providing alphanumeric data to the displays. These interface circuits further have respective bidirectional serial data lines 92, 94 and 96 which are connected to different ports of the bidirectional serial data ports of the video and data channel selector 12. Each of the video cameras 68, 70 and 72 has a video output line that is connected to the corresponding one of the interface circuits 86, 88 and 90. These video outputs are routed through the respective interface cards to corresponding video lines 74, 76 and 78 which are connected to different video inputs of the video and data channel selector 12. The interface circuits 86, 88 and 90 are further described in FIG. 3.

The computer 16 includes a conventional display 100 and keyboard 102. The display and keyboard are typically used for setup and maintenance for the system 10, but are not necessary for routine operation, and in fact, may be removed to prevent unauthorized modification or interference with the system operation.

The computer 16 is connected to a conventional video board 104. Video boards are well-known and widely available as accessories for personal computers. The video board 104 receives an analog video input sign and upon command from the computer 16 captures a frame which comprises a video image, digitizes that image and provides it as digital data to the computer 16. The video board 104 is connected by a video line 106 to the video output of the video and data channel selector 12. Thus, the video board 104 can be connected to any one of the lobby cameras or teller cameras.

The computer 16 is further provided with a conventional modem 108 which is connected to a standard telephone line 110 that extends to a telephone central office. The computer 16 further includes a disk drive 112 for storing operational programs, transaction data files and video image files.

A conventional laptop computer 120, which can be an IBM compatible computer well known in the industry, is equipped with a modem that can be connected via a telephone line 122 to a telephone central office so that it is connected via line 110 to the modem 108 and ultimately to the computer 16. The laptop computer 120 can be used for remote access to data files and image files which have been stored by the computer 16 on the disk drive 112.

Figure 2:
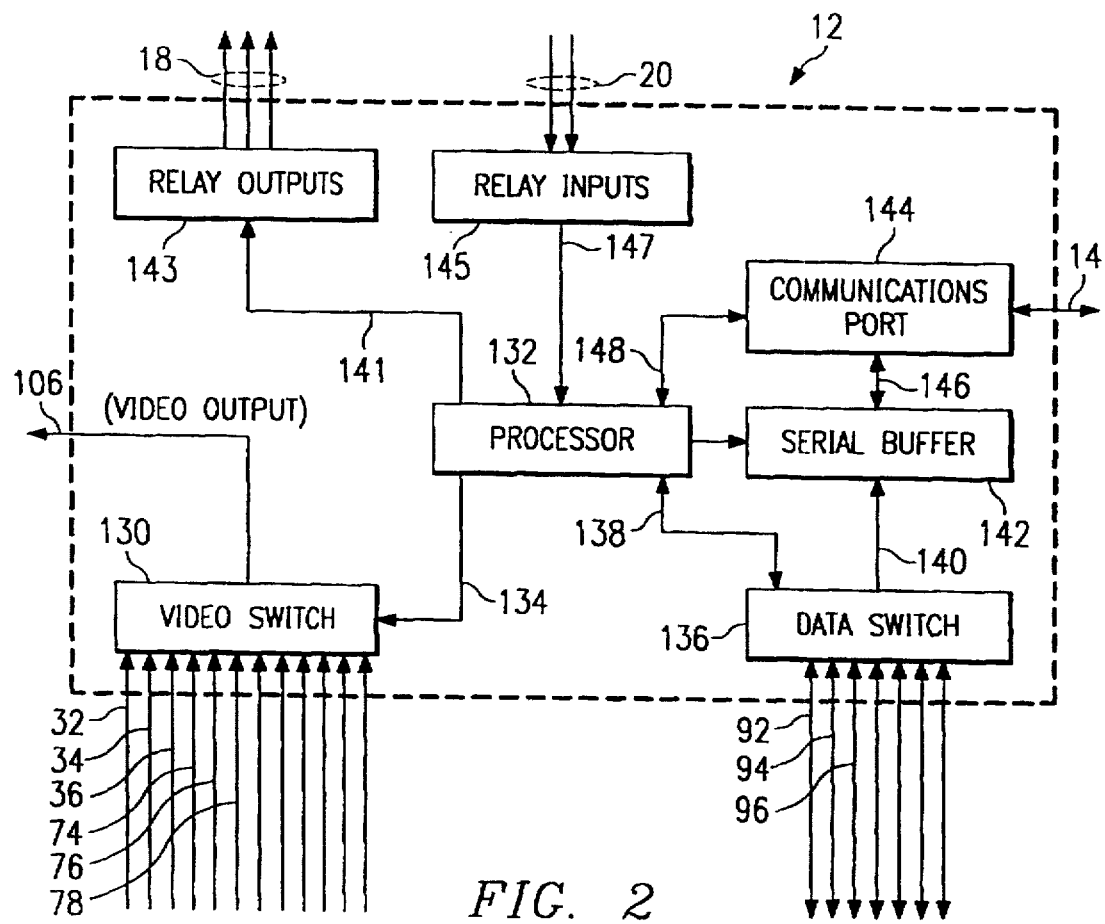
FIG. 2 is a block diagram of the video and data channel selector shown in FIG. 1.

A further, more detailed description of the video and data channel selector 12 is shown in FIG. 2. The video input lines which include lines 32, 34, 36, 74, 76 and 78 are connected to a video switch 130 which functions to connect any one of the twelve inputs to the single video output line 106. A processor 132, which is preferably an Intel model 8051 microcontroller or derivative, controls the operation of the video and data channel selector 12. Processor 132 operates the video switch 130 through a line 134.

The bidirectional serial data lines 92, 94 and 96 are connected to a bidirectional data switch 136 which is connected by a bidirectional control line 138 to the processor 132. The data switch 136 is connected through a data line 140 to a serial buffer 142.

A communications port 144, which provides industry standard RS232 serial communications, is connected through a bidirectional data line 146 to the serial buffer 142 and through a bidirectional line 148 to the processor 132. The communications port 144 is connected to the bidirectional serial communication line 14.

The input lines 20 are connected to a group of relay inputs 145 which provide corresponding inputs through a line 147 to the processor 132. An input on any of the lines 20 produces an interrupt for the processor 132 which in turn notifies the computer 16 of the existence of such an interrupt through the communications port 144 and line 14.

The processor 132 is further connected through a line 141 to a set of relay outputs 143. The processor 132 can selectively close any one of the relay outputs corresponding to the individual ones of the lines 18. This is done in response to commands received from the computer 16.

Figure 3:
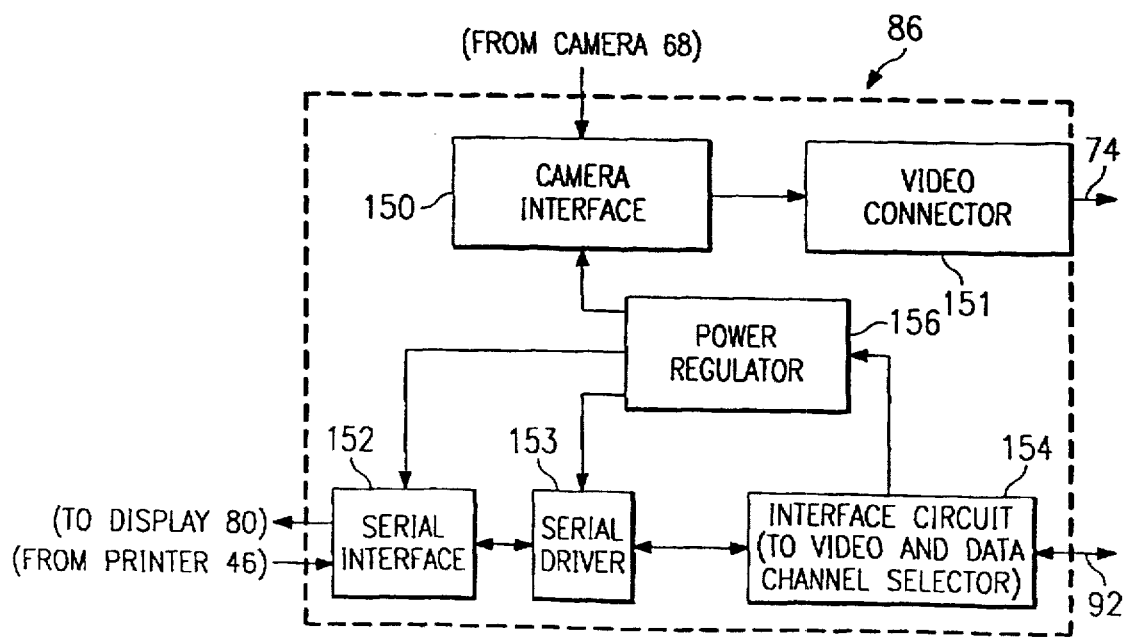
FIG. 3 is a block diagram of the interface circuit in each of the camera towers shown in FIG. 1.

The interface circuit 86, which is the same as the interface circuits 88 and 90, shown in FIG. 1 is further described in reference to FIG. 3. The video signal from the camera 68 is provided to a camera interface 150 which transfers the video signal to a video connector 151. The connector 151 is in turn connected to the video line 74 to provide one of the multiple video inputs to the video and data channel selector 12. The display 80 receives data through a line from a serial interface 152 which also receives the receipt printer record from the printer 46. The serial interface 152 is connected through a bidirectional serial line to a serial driver 153 which is also connected through a bidirectional serial line to an interface circuit 154 that is connected to the bidirectional serial line 92. The interface circuit 154 further receives power from the video and data channel selector 12 and this power is provided through a connection to a power regulator 156 which provides regulated power to the camera interface 150 (for powering the video camera), the serial interface 152 and the serial driver 153.

A description of the operation of the security system 10 is now made in reference to FIGS. 1 and 2. The primary function of the system 10 is to record images related to transactions and security in a bank. A system 10 can be installed at each branch of a bank. The transaction images are primarily provided by the teller cameras and the security images are primarily provided by the lobby cameras, but security images can also be provided by the teller cameras.

It is highly desirable in a banking operation to have an image saved which shows the person who made a customer transaction so that at a later time there can be a verification of whether this transaction occurred and an image to verify the identity of the person who made the transaction. A typical teller station in a bank has a receipt printer, such as printer 46, which the teller uses to enter a sequence number, transaction amount and other required data into a central bank computer for each transaction with a customer. For example, if a customer deposits a check, the teller enters the account number and amount and a receipt is printed. This transaction is electronically entered into the bank's central computer through the electronics associated with the receipt printer. All of the relevant information is included within a printer record which is transmitted through a serial line into the bank's central computer. This information is also provided directly to the system 10 of the present invention.

When a transaction occurs at a teller station, such as station 40 shown in FIG. 1, and an electronic printer record is produced, this record is transmitted through line 52 and the interface circuit 86 to the line 92 which provides the record to the video and data channel selector 12. Referring to FIG. 2, the printer record is received by the data switch 136 which notifies the existence of such a record via line 138 to the processor 132. Each of a plurality of records received from the printers is transmitted through the line 140 to the serial buffer 142. If a plurality of such records are received during a short period of time, they are stored in the buffer 142 until they can be sent one by one through the communications port 144 via line 14 to the computer 16. This buffering in communication operation is controlled by the processor 132.

Upon receipt of the printer record by the computer 16, a data file is created which includes:

(1) identification of the teller station;

(2) the date and time of the transaction;

(3) the account number;

(4) the branch of the bank in which the teller station is located; and (5) a sequence number.

Upon receipt of this information, a camera selector command is sent from the computer 16 via line 14 to the communication port 144 and then through line 148 to the processor 132. The computer 16 has stored therein a table which relates the video camera at each teller station to the identification of that teller station. The command sent by the computer 16 directs the processor 132 to activate the video switch 130 to connect one of the multiple inputs to the single video output line 106. For example, if the printer 46 generates the printer record, a computer 16 produces a command which is transmitted to the processor 132 which commands the video switch 130 to connect video line 74 to the video output of the selector 12. This transfers a video signal from camera 68 at teller station 40, via the video and channel selector 12 and line 106 to the video board 104. When the video signal has stabilized at board 104, the computer 16 commands the video board 104 to capture and digitize the image present at the video board. This digitized image is then transferred as digital data to the computer 16 which creates an image file that is stored on the disk drive 112. Each image file has a unique file name. This file name is recorded in the corresponding data file for the receipt printer transaction. Thus, for each transaction data file, there is included a reference to the image that was taken at the teller station for that transaction.

Each image file can be referenced by any one of the following data items, index references, which has been stored in the corresponding data file:

(1) date and time;

(2) teller number;

(3) sequence number;

(4) branch number; and (5) account number.

The image captured as a result of a teller transaction is preferably compressed so that the stored video image is much smaller than the data that is provided to the computer 16 directly from the video board 104.

The above-described operation occurs for each transaction which occurs at a teller station and which results in the generation of a printer record that is transmitted into the bank's central computer.

Further referring to FIGS. 1 and 2, the surveillance aspect of system 10 primarily involves sequential image capture through the lobby cameras 26, 28 and 30. As many cameras as necessary may be provided and covered areas can include access corridors and doors as well. If desired, the teller cameras can also be included in the surveillance aspect. In the surveillance operation, a predetermined set of the cameras are identified for image capture and these are accessed in a sequential, rotating fashion. This means that they are accessed in order and, when the last one is accessed, the first one in the order is again accessed and this process is repeated continually. When an image is captured for a particular camera, that image is stored temporarily without data compression. When the next image is captured by that camera, the present and previous images are compared on a pixel by pixel basis. If the difference from one image to the next is minor, for example, less than five percent of the pixels have changed, then the present image is stored temporarily and the previous image is discarded. But, if more than five percent of the pixels have changed, the present image is then compressed and stored as well as maintained as a temporary image. This cycle is repeated for the next received image for each camera. This operation serves to detect motion or any other changes which occur in the field of view of the camera. However, by requiring a minimum threshold of change before an image is actually captured and stored, slow moving changes, such as shadows moving across the lobby during the day and variations in sunlight intensity, do not trigger the system which would otherwise create an excessive number of images to be stored. As a result of this selection of only images in which there are changes, the system 10 can use a smaller storage capacity for the disk drive 112 than if all images were stored.

A further aspect of the present invention is an emergency mode of operation. When an emergency signal input, such as a robbery alarm indication, is received through one of the lines 20 at the relay inputs of the video and data channel selector 12, the usual operations of the computer 16 are interrupted and an emergency mode of operation for image capture and retention is begun. This is described in detail in reference to FIG. 5. When this mode is entered, a predefined set of cameras are sequentially activated for image capture in a rotating fashion. The computer 16 sends a command via the selector 12 to connect the first of the sequence of cameras to the video board 104. The computer then commands that the video board capture the image from that camera and that image is identified as a file and immediately stored without compression. The file is identified by date, time, camera and branch location. The computer 16 next sends a command to the video and data channel selector 12 to connect the next camera in the emergency sequence through video switch 130 to the video board 104. The computer 16 then commands that the video board 104 capture that image, digitize it and provide it as a file to the computer 16. The computer 16 then applies a file identifier together with a date, time and camera number and likewise stores that file on the disk drive 112. These images are preferably stored without compression so that the highest possible resolution is retained. This operation is repeated for each of the identified cameras in the emergency set. The operation is continued until terminated by an operator input or upon filling up of the disk drive 112. Thus, if a robbery alarm is received, a large number of high resolution images are rapidly captured and securely stored.

In operation, a system 10 is preferably installed in each branch of a bank. It is typical in an urban environment today that a single bank can have dozens of branches in a single city and hundreds of branches across the nation. By including an identification of the branch number with each video image stored, it is possible for a security monitor, or bank manager, to access any branch throughout a city or across the nation, and retrieve image data related to a particular transaction or to view images captured by surveillance cameras. For example, a bank manager using the laptop computer 120 connected through a telephone line 122 can access the computer 16 through the modem 108. If this manager is interested in verifying a particular transaction, that transaction file can be retrieved by any of the data references (indexes) stored for that file, such as date and time, teller number, account number or sequence number. Once the transaction file is identified, the manager can retrieve the corresponding image file for an identity of the particular person who conducted the transaction. This file can be transferred through the telephone lines to the laptop computer 120 or displayed on the screen display 100 or printed by a printer connected to computer 16 or computer 120. The image is displayed or printed with the corresponding data as shown in FIG. 7.

In a surveillance situation, the manager, such as through operation of the laptop computer 120, can examine selected ones or all of the surveillance images for a particular branch, and may select a particular time or particular lobby location, and then examine each of the images which was produced as a result of the changes exceeding the predetermined thresholds, as described above.

A further operation which can be done remotely by use of the laptop computer 120 when connected via the telephone lines 122 and 110 to the computer 16 is to activate a selected camera to retrieve an image. For example, if the manager operating the laptop computer 120 desires to see the view of the lobby provided by lobby camera 28, a command identifying camera 28 is provided through the lines 122 and 110 to the modem 108 and then to the computer 16. The computer 16 then generates a command which is transmitted through line 14 to the video and data channel selector 12. Within the selector 12, the command is provided to the processor 132 which activates the video switch 130 which in turn connects video line 34 at the video input of selector 12 to the video output so that the video signal from camera 28 is transmitted through line 106 to the video board 104. Board 104 is then commanded by the computer 16 to capture and digitize the image provided thereto. This image is then compressed and transmitted through the modem 108 and the telephone lines 110 and 122 to the laptop computer 120 where the image is produced on the display of the computer 120. Thus, a manager or security officer can remotely monitor a facility at any distance for observing selected areas of the bank facility.

Operation of the system 10 to provide image capture related to transactions is now further described in detail in reference to a flow diagram in FIG. 4 and in conjunction with the system diagrams shown in FIGS. 1 and 2. At a start point 160 the system begins operation. The system is always responsive to an emergency alarm input which interrupts routine operations. This is shown in FIG. 5. Question block 166 determines if a new receipt printer report has been received. If the answer is NO, entry is made to an operational block 168 to conduct routine surveillance operation for scanning the images from a selected group of cameras, as further described below in reference to FIG. 6. Following operational block 168, control is returned to the question block 166 in sequence.

If a new receipt printer record has been received, the YES exit is taken from question block 166 to an operational block 170. In this block, the receipt printer data is stored as a printer record. This data file includes the following:

(1) branch number;

(2) date and time;

(3) teller number;

(4) teller sequence (transaction) number.

Following operational block 170, entry is made to an operational block 172 in which the computer 16 sends a command via line 14, the communication port 144 and the processor 132 for operating video switch 130 to selectively connect one of the multiple inputs to this switch to the single video output at line 106. The command includes an identification of the video camera related to the teller station which generated the receipt printer report. Next, the computer 16 activates the video capture board 104 in operational block 174 to produce a digitized image from the signal which was received from the video camera located at the corresponding teller station.

In operational block 176 the received image is compressed to reduce its size so that a greater number of images can be stored on the disk drive 112. There are numerous products on the market for providing compression of video data files.

Following operational block 176, control is transferred to an operational block 178 in which the computer 16 stores the compressed image as a particular file and identifies that file in the corresponding data file for the teller station transaction. Upon completion of this operation, control is returned to the input of the question block 166 to repeat the operation for the next received receipt printer report.

The operation of the emergency alarm, such as a robbery alarm, is further described in reference to FIG. 5. An emergency alarm signal is provided as a relay closure through one of the lines 20 to the video and data channel selector 12. As shown in FIG. 2, the relay input is provided to the processor 132 as an interrupt, and the processor 132 transmits a corresponding signal as an interrupt through the communications port 144 to the computer 16. When an emergency alarm is received as indicated by operational block 164, the computer 16 carries out the operation described in block 190 to designate the first camera in a preset rotating emergency sequence. The cameras to be used in an emergency operation are designated in advance based upon the physical layout of the particular branch bank and the positions of the relevant cameras.

After the first camera in the sequence has been designated, the computer 16 sends a command via the bidirectional communication line 14 to the communication port 144 within the video and data channel selector 12. This command is then provided to the processor 132 which then activates the video switch 130 to connect the appropriate video camera to the video output line 106. This is done in operational block 192. In operational block 194 the computer 16 activates the video board 104 to capture the image from the designated camera.

Next, in operational block 196, the image is stored, without compression, to the disk 112 by the computer 16. The image is preferably not compressed so that it will maintain the maximum resolution. However, if resolution with compression is adequate, there may be compression to minimize space usage on the disk drive 112.

Upon completion of the operational block 196, a question block 198 is entered to determine if a stop command has been received from an operator. If the answer is YES, an operational block 200 is entered which runs the operation to the start block 160 in FIG. 3. If the answer is NO, the question block 202 is entered to determine if the disk drive 112 is full. If the answer is YES, then operational block 204 is entered to stop operation. This is done because it is not desirable to overwrite the previous images after a given period of time.

If the response in question block 202 is NO, then an operational block 206 is entered to designate the next camera in the emergency sequence for capturing an image. When this new designation has been made, control is returned to operational block 192 to initiate the command for capturing the image from the newly designated camera. The following operation blocks are then carried out in sequence so that images are captured from each camera in order. This sequence is repeated until either a stop command is received or the disk 112 is filled.

Figure 6:
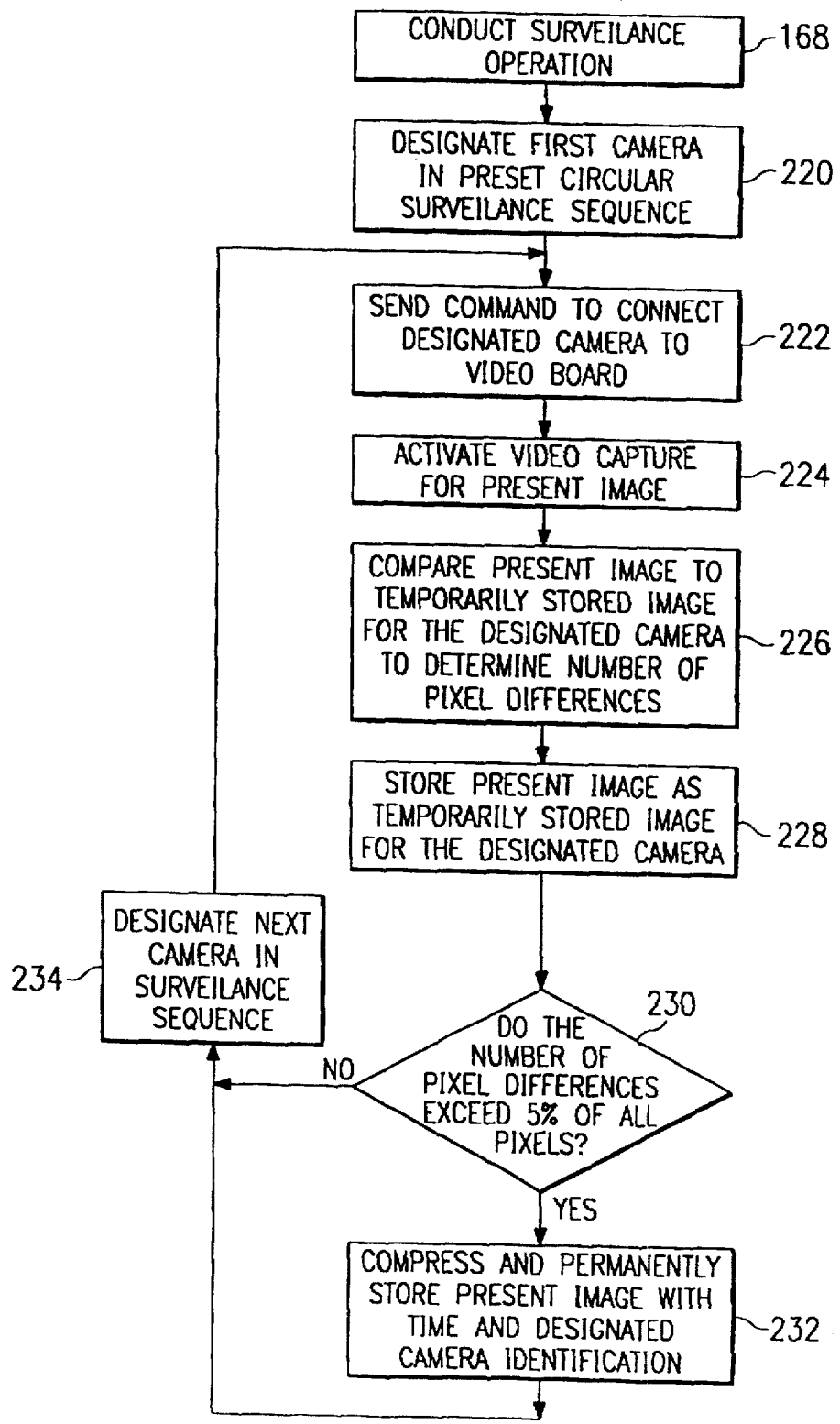
FIG. 6 is a flow diagram illustrating image capture, comparison to a previous image, and storage if sufficient image difference has been detected, primarily for detecting motion.

The surveillance operation described above and as indicated by operational block 168 in FIG. 3 is described in further detail in FIG. 6. The surveillance operation can be carried out either on a routine basis throughout the day together with teller image capture, or it can be selectively operated on a timed basis. The purpose of surveillance is to monitor areas of the bank for security. Such many areas must be monitored over a long period of time, the storage of all images during this time would be extremely difficult. One aspect of the present invention is to provide such security surveillance but to dramatically reduce the amount of image data that is stored.

Following operational block 168, entry is made to an operational block 220 which designates a first camera in a present rotating surveillance sequence. As with the emergency sequence, any group of cameras can be set to be in the surveillance sequence, and this sequence is repeated in a circular fashion, the first one following the last one.

The surveillance cameras can be timed to operate at any desired sampling rate. For example, each camera could be set to have an image capture every fifteen seconds.

Following the designation of a particular camera in operational block 220, entry is made to an operational block 222 in which a selected command is sent from the computer 16, as described above, via the video and data channel selector 12 to activate the video switch 130 therein to connect the designated one of the video cameras to the single video line 106 that is in turn connected to the video board 104. Next, in operational block 224 video capture board 104 is activated to capture the image from the connected video camera.

Following operational block 224, the computer system carries out the operation described in operational block 226. The present image from the designated camera is compared to a temporarily stored image which was previously received from the same camera. There will not be such an image available until the system has made a first cycle through each of the cameras to capture the first image and temporarily store that image. The present image is compared on a pixel-by-pixel basis to the temporarily stored image for the same camera to determine the number of pixel differences. Two thresholds are set for this image comparison. First, there is a threshold set to determine what constitutes a similar or different pixel. A preferred setting of the threshold for a pixel comparison is eight graduations for a black and white pixel which has 128 shades of gray. If the difference between corresponding pixels in the two images is at least eight, then that pixel is designated as having changed. For example, if a selected pixel had a gray scale value of 60 in the temporarily stored image and the corresponding pixel in the present image had a gray scale of 65, then it would be designated that there is no change. However, if the present image panel had a gray scale of 70, then it would be designated as a changed pixel. The amount of change necessary to designate a pixel as having changed can be selected by the operator. Thus, a minor change in a particular pixel does not constitute a difference sufficient to contribute to triggering an image capture.

The second threshold comprises a percentage of pixels that must change from one image to the next before the present image is stored. This is a variable threshold which can be selected by an operator. A preferred setting is five percent (5%). At this level, changes that occur slowly throughout a day, such as shadows shifting position due to movement of the sun, will not trigger the capture of an image and therefore unnecessary images will not be stored. However, any sudden change in the image, such as a person walking across the field of the video camera, will create more than five percent change in the pixels and therefore cause an image to be captured and stored. The selection of only a changed image for storage substantially reduces the number of images that are stored and thereby conserves storage space on the disk drive 112.

Following operational block 226, control is transferred to an operational block 228 in which the present image for the designated camera is temporarily stored for later comparison to the next received image at that camera.

Next, a question block 230 is entered and in this block it is determined if the number of pixel differences between the temporarily stored image and the present image exceeds five percent of all pixels. If the answer is YES, then entry is made to an operational block 232 in which the present image is compressed, assigned a file number and permanently stored. A data file is stored with an identification of the time and date, the camera and branch location, and the identification of the image file. If the response to question block 230 is NO, that is, the comparison did not show a sufficient number of pixel differences, a transfer is made to an operational block 234 in which the next camera in the surveillance sequence is designated and control is returned to operational block 222 where the process described above is repeated for the next designated camera. The present image is not permanently stored.

When it is desired by a bank employee or a security officer to access a particular teller image, this is done through the indexing provided with the associated data file. If the person requesting the image is located off-site, then that person can dial in through a modem to the computer 16 and by use of a password enter that computer for a particular branch. Next, the operator can select a particular date and a listing is provided for all transaction numbers that occurred on that date. The operator can then select the desired sequence number which then indicates the corresponding teller number and determine if that is the particular teller number and sequence number of interest. If so, the operator can then call up the corresponding unique image file and have that image file transferred to the operator's computer for display and printing if desired.

In summary, the present invention provides digital image capture and storage for identifying the persons who conducted each recorded transaction at the teller stations in a bank. A data file is provided for each image so that through indexing a user can rapidly locate the desired image. A surveillance aspect is provided in which all of the necessary areas of the bank are monitored for extended periods of time, but only images are stored which represent changes from previous images. Thus, the amount of image storage is very substantially reduced. Finally, the system of the present invention provides emergency monitoring in which images from a defined set of emergency cameras are rapidly collected and securely stored with high resolution.

Although one embodiment of the invention has been illustrated in the accompanying drawings and described in the foregoing Detailed Description, it will be understood that the invention is not limited to the embodiment disclosed, but is capable of numerous rearrangements, modifications and substitutions without departing from the scope of the invention.

What we claim is:

1. A video image acquisition and information system for use in conjunction with a transaction machine which produces selected data upon occurrence of a transaction, comprising:

a plurality of video cameras corresponding respectively to said transaction machines, a controller coupled to receive the data outputs from said transaction machines, a video switch having a plurality of inputs connected to said video cameras and having a video output, said video switch coupled to receive a command from said controller to connect a selected one of said video cameras to said video output of said video switch, an image digitizer connected to said controller and to said output of said video switch for producing a digital video frame image in response to a command from said controller, a plurality of digital data records each corresponding to one of said transactions and including said selected data, a respective digital image file for each of said digital video frame images, and a digital storage connected to said controller for storing in said digital storage a plurality of said digital image files together with a plurality of said digital data files each of which is associated with a respective one of said stored digital image files wherein each associated pair of one of said data records and one of said image files has a respective unique identifier that is stored in both the data record and the image file of an associated pair.

2. A video image acquisition and information system as recited in claim 1 wherein each of said digital image files has a file name and said file name is included in the associated data record for each said digital image file.

3. A video image acquisition and information system as recited in claim 1 wherein said image file does not include said selected data which is stored in the corresponding data record.

4. A video image and acquisition system as recited in claim 1 wherein each said data record is a file.

5. A video image retention and information system used in conjunction with a plurality of bank teller system printers each of which produces a print record which includes at least an account number, teller number and sequence number for each transaction, comprising:

a plurality of video cameras corresponding respectively to said bank teller system printers, a video channel and data selector connected via a video line to each of said video cameras and to each of said bank teller system printers via a data line for receiving said print records therefrom, wherein said video channel and data selector connects one of said video cameras to a video output of said selector upon the generation of a print record by a one of said teller system printers corresponding to said one video camera, a control computer, an image digitizer connected to said control computer and to said video output of said channel and data selector, said digitizer produces a digital video frame image which is provided to said control computer, a digital storage connected to said control computer, and wherein said control computer stores said digital image on said digital storage as a digital image file together with said print record which is associated with the teller system printer which produced said print record provided to said channel and data selector and wherein said print record is dirty associated with said stood digital image file by a unique identifier that is included in both said print record and said digital image file.

6. A method for acquiring and storing video images and related data, comprising the steps of:

monitoring the outputs from a plurality of transaction machines to detect the generation of selected data by any one of said transaction machines, in response to detecting the generation of selected data by a one of said transaction machines, connecting the output of a video camera, which corresponds to said one transaction machine, to an input of an image digitizer, activating said image digitizer to produce a video digital frame image when said video camera has ben connected to said image digitizer, producing a digital image file for said digital image, producing an identification for said digital image file, producing a digital data record after the generation of said selected data by said one transaction machine, said digital data record including at least said selected data and said identification for said digital image file, wherein said identification is a unique identifier for associating said digital image file with its corresponding digital data record, and storing said digital image file and said digital data record on a digital storage, wherein said digital data record references said digital image file by said identification.

7. A method for acquiring and storing video images and related data as recited in claim 6 including the steps of compressing said digital image before said step of storing said digital image.

8. A method for acquiring and storing video images as recited in claim 6 wherein said image file does not include said selected data which is stored in the corresponding data record.

9. A method for acquiring and storing video images as recited in claim 6 wherein each said data record is a file.

* * * * *

UNITED STATES PATENT AND TRADEMARK OFFICE
CERTIFICATE OF CORRECTION

PATENT NO. : 5,751,345
DATED : May 12, 1998
INVENTOR(S) : Charles Wayne Dozier

It is certified that error appears in the above-identified patent and that said Letters Patent is hereby corrected as shown below:

Col. 13, Claim 5, line 18, change "dirty" to --directly--.

Col. 13, Claim 5, line 18, change "stood" to --stored--.

Col. 14, Claim 6, line 2, change "ben" to --been--.

Signed and Sealed this

Twenty-fourth Day of August, 1999

Attest:

Q. TODD DICKINSON

*Attesting Officer*         *Acting Commissioner of Patents and Trademarks*

UNITED STATES PATENT AND TRADEMARK OFFICE
CERTIFICATE OF CORRECTION

PATENT NO.   : 5,751,345
DATED        : May 12, 1998
INVENTOR(S)  : Dozier et al.

It is certified that error appears in the above-identified patent and that said Letters Patent is hereby corrected as shown below:

Column 2,
Line 5, delete "INVASION" and substitute -- INVENTION --.

Signed and Sealed this

Second Day of December, 2003

JAMES E. ROGAN
*Director of the United States Patent and Trademark Office*

UNITED STATES PATENT AND TRADEMARK OFFICE
CERTIFICATE OF CORRECTION

PATENT NO. : 5,751,345
DATED : May 12, 1998
INVENTOR(S) : Dozier et al.

It is certified that error appears in the above-identified patent and that said Letters Patent is hereby corrected as shown below:

Column 12,
Line 19, delete the word "a"
Line 19, delete "machine" and substitute -- machines --
Line 19, delete "produces" and substitute -- produce --
Line 43, delete "files" and substitute -- records --

Column 14,
Line 21, insert -- file -- immediately following "image".

Signed and Sealed this

Twenty-second Day of February, 2005

JON W. DUDAS
*Director of the United States Patent and Trademark Office*